D. PUDLIN.
EYE FOR DOLLS.
APPLICATION FILED NOV. 10, 1916.

1,221,589.  Patented Apr. 3, 1917.

WITNESSES
Frederick Diehl.
C. Bradway.

INVENTOR
David Pudlin
BY
ATTORNEYS

UNITED STATES PATENT OFFICE.

DAVID PUDLIN, OF NEW YORK, N. Y.

EYE FOR DOLLS.

1,221,589.  Specification of Letters Patent.  Patented Apr. 3, 1917.

Application filed November 10, 1916. Serial No. 130,546.

*To all whom it may concern:*

Be it known that I, DAVID PUDLIN, a citizen of the United States, and a resident of the city of New York, borough of the Bronx, in the county of the Bronx and State of New York, have invented a new and Improved Eye for Dolls, of which the following is a full, clear, and exact description.

This invention relates to eyes for dolls and it has for its general object to provide eyes, and means for connecting the eyes together, of novel, simple and inexpensive construction.

A more specific object of the invention is the provision of a metallic connecting piece between the eyes which is capable of being bent to properly adjust the eyes with respect to the inequalities in the eye sockets of the doll's head, the connecting piece being in the form of a metal stamping of rigid and durable form and so designed that the eyes can be easily and quickly adjusted to obtain the proper set.

With such objects in view, and others which will appear as the description proceeds, the invention comprises various novel features of construction and arrangement of parts which will be set forth with particularity in the following description and claims appended hereto.

In the acompanying drawing, which illustrates one embodiment of the invention and wherein similar characters of reference indicate corresponding parts in all the views, Figure 1 is a front view of the set of doll's eyes and the connecting piece;

Figure 1:
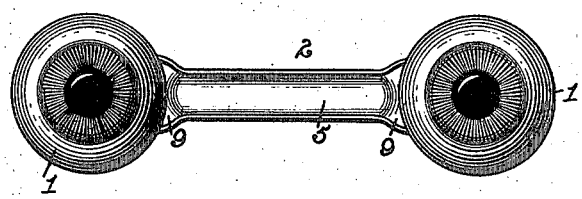
Figure 2:
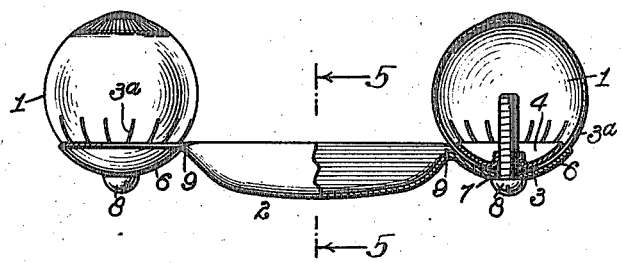
Fig. 2 is a plan view with one of the eyes and part of the connecting piece in section.
Figure 3:
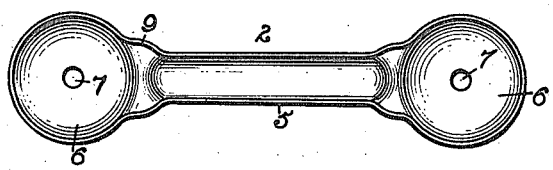
Fig. 3 is a front view of the connecting piece.
Figure 4:
Fig. 4 is a sectional view of one of the clamping nuts.
Figure 5:
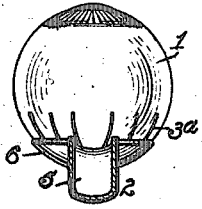
Fig. 5 is a vertical section on the line 5—5, Fig. 2.

Referring to the drawing, 1 designates the eyes and 2 the connecting piece, the eyes being hollow, spherical bodies preferably although not necessarily made as shells disclosed in United States Letters Patent, Number 1,187,926, granted to me on the 20th day of June, 1916.

The body of the eye is formed with an opening 3, and from this opening radiate slits 3ª, whereby the opening can be greatly enlarged for permitting the threaded washers or nuts 4 to be inserted into the chambers of the eyes.

The connecting piece 2 is a metal stamping and comprises a channel bar 5 and shallow end sockets 6, each end socket having an aperture 7 for the insertion of a screw or bolt 8. The bolts 8 pass through the openings 3 in the eyes and screw into the nuts 4, whereby the eyes are firmly clamped between the nuts 4 and the end sockets 6. The end sockets or seats 6 are united with the hollowed portion or bar 5 of the connecting piece by bendable connecting portions 9, which permits the sockets 6 to be adjusted to produce the proper set of the eyes. This adjustment is often necessary because the dolls' heads are not always uniform and inequalities necessitate the adjusting of the eyes.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of a set of eyes, with a connecting piece comprising a central channeled bar, and terminal fastening means for the eyes, the connecting piece being bendable at the ends of the bar.

2. The combination of a set of eyes, with a connecting piece comprising a channeled bar and terminal seats for the eyes, and means for fastening the eyes to the seats, the connecting piece being bendable at the juncture of the seats with the bar.

3. The combination of a set of eyes, with a connecting device comprising a single piece of metal shaped with shallow end sockets and a channeled bar, and fasteners securing the eyes to the said sockets.

4. The combination of a set of eyes, with a connecting device comprising a single piece of metal shaped with shallow end sockets and a channeled bar, and fasteners securing the eyes to the said sockets, there being bendable portions between the sockets and bar for permitting the eyes to be adjusted.

5. The combination of a set of hollow eyes and a connecting device comprising a bar and shallow end sockets into which the eyes fit, nuts within the eyes, and bolts passing through the sockets and eyes and engaging the said nuts.

6. The combination of a pair of hollow eyes, with a connecting device comprising a channeled bar and end sockets connected therewith by bendable portions, nuts within the eyes, and threaded members passing through the sockets and extending into the eyes and engaged with the nuts, whereby the eyes are clamped between the sockets and nuts.

7. A connecting device for dolls' eyes, comprising a channeled bar having integrally connected eye-receiving sockets at its ends.

8. A connecting device for dolls' eyes, comprising a channeled bar having integrally connected eye-receiving sockets at its ends, the portions between the sockets and bar being bendable.

9. A celluloid eye of spherical form and having an opening at its rear and radiating slits from the said opening, and a mounting on which the apertured and slit portion of the eye is fastened.

10. A doll's eye comprising a hollow spherical shell having an aperture in its rear and slits extending from the aperture, a nut within the shell and larger than the aperture thereof, a mounting fitting the outside of the shell at the rear, and a screw passing through the mounting and having a threaded engagement with the nut.

11. The combination of a mounting for an eye having an eye-receiving socket, an eye seated in the said socket and provided with an opening, a nut within the eye, and a fastener of smaller diameter than the opening and extending through the said socket and the nut for clamping the eye rigidly in place, the edge of the opening being pliant to permit the opening to be enlarged for the insertion of the nut.

12. The combination of a set of eyes, with a connecting piece in the form of a bendable channeled bar, and means on the end thereof for fastening the eyes in place.

DAVID PUDLIN.